(12) United States Patent
Fissore et al.

(10) Patent No.: US 6,185,528 B1
(45) Date of Patent: Feb. 6, 2001

(54) METHOD OF AND A DEVICE FOR SPEECH RECOGNITION EMPLOYING NEURAL NETWORK AND MARKOV MODEL RECOGNITION TECHNIQUES

(75) Inventors: Luciano Fissore, Collegno; Roberto Gemello, Alpignano; Franco Ravera, Cirie, all of (IT)

(73) Assignee: CSELT - Centro Studi e Laboratori Telecomunicazioni S.p.A., Turin (IT)

( * ) Notice: Under 35 U.S.C. 154(b), the term of this patent shall be extended for 0 days.

(21) Appl. No.: 09/302,210

(22) Filed: Apr. 29, 1999

(30) Foreign Application Priority Data

May 7, 1998 (IT) ............................... TO98A0383

(51) Int. Cl.[7] .................................................. G10L 15/16
(52) U.S. Cl. .......................................... 704/232; 704/256
(58) Field of Search .................... 704/231, 232, 704/247, 252, 256

(56) References Cited

U.S. PATENT DOCUMENTS

| | | | |
|---|---|---|---|
| 5,278,911 | * 1/1994 | Bickerton | 704/232 |
| 5,307,444 | * 4/1994 | Tsuboka | 706/20 |
| 5,566,270 | * 10/1996 | Albesano et al. | 704/232 |

FOREIGN PATENT DOCUMENTS 2 240 203 * 7/1991 (GB) ............................... G10L/5/06

OTHER PUBLICATIONS

"Speech Recognition Using Segmental Neural Nets", S. Austin et al, BBN Systems and Technologies, Cambridge MA., 1992 IEEE, 4 pages.

* cited by examiner

*Primary Examiner*—David R. Hudspeth
*Assistant Examiner*—Abul K. Azad
(74) *Attorney, Agent, or Firm*—Herbert Dubno

(57) ABSTRACT

A method and a device for recognition of isolated words in large vocabularies are described, wherein recognition is performed through two sequential steps using neural networks and Markov models techniques, respectively, and the results of both techniques are adequately combined so as to improve recognition accuracy. The devices performing the combination also provide an evaluation of recognition reliability.

16 Claims, 4 Drawing Sheets

METHOD OF AND A DEVICE FOR SPEECH RECOGNITION EMPLOYING NEURAL NETWORK AND MARKOV MODEL RECOGNITION TECHNIQUES

FIELD OF THE INVENTION

The invention relates to automatic speech recognition systems and, in particular, to a method and a device for isolated word recognition in large vocabularies, wherein words are represented through a combination of acoustic-phonetic units of the language and wherein recognition is effected through two sequential steps in which the techniques of neural networks and Markov models are respectively used, and the results of both techniques are adequately combined so as to improve recognition accuracy.

BACKGROUND OF THE INVENTION

Neural networks are a parallel processing structure reproducing the cerebral cortex organization in very simplified form. A neural network is formed by numerous processing units, called neurons, strongly interconnected through links of different intensity, called synapses or interconnection weights. Neurons are generally organized according to a layered structure, comprising an input layer, one or more intermediate layers and an output layer. Starting from the input units, which receive the signal to be processed, processing propagates to the subsequent layers in the network up to the output units that provide the result. Various implementations of neural networks are described, for example, in the book by D.Rumelhart "Parallel Distributed Processing", Vol. 1—Foundations, MIT Press, Cambridge, Mass., 1986.

Neural network technique is applicable to many sectors and in particular to speech recognition, where a neural network is used to estimate probability $P(Q|X)$ of a phonetic unit Q, given the parametrin representation X of a portion of the input speech signal. Words to be organized are represented as a concatenation of phonetic units and a dynamic programming algorithm is used to identify the word having the highest probability to be that being uttered.

Hidden Markov models are a classical speech recognition technique. A model of this type is formed by a number of states interconnected by the possible transitions. Transitions are associated with a probability of passing from the origin state to the destination state. Further, each state may emit symbols of a finite alphabet, according to a given probability distribution. In the case of speech recognition, each model represents an acoustic-phonetic unit through a left-to-right automaton in which it is possible to remain in each state with a cyclic transition or to pass to the next state. Furthermore, each state is associated with a probability density defined over X, where X represents a vector of parameters derived from the speech signal every 10 ms. Symbols emitted, according to the probability density associated with the state, are therefore the infinite possible parameter vectors X. This probability density is given by a mixture of Gaussian curves in the multidimensional space of the input vectors.

Also in case of hidden Markov models, words to be recognized are represented as a concatenation of phonetic units and use is made of a dynamic programming algorithm (Viterbi algorithm) to find out the word uttered with the highest probability, given the input speech signal.

More details about this recognition technique can be found e.g. in: L. Rabiner, B- H. Juang "Fundamentals of speech recognition", Prentice Hall, Englewood Cliffs, N.J. (USA).

The method of this invention makes use of both the neural network technique and the Markov model technique through a two-step recognition and a combination of the results obtained by means of both techniques.

A recognition system in which scores of different recognisers are combined to improve performance in terms of recognition accuracy is described in the paper "Speech recognition using segmental neural nets" by S.Austin, G.Zavaliagkos, J. Makhoul and R. Schwartz, presented at the ICASSP 92 Conference, San Francisco, March 23–26, 1992.

This known system performs a first recognition by means of hidden Markov models, providing a list of the N best recognition hypotheses (for instance: 20), i.e. of the N sentences that have the highest probability to be the sentence being actually uttered, along with their likelihood scores. The Markov recognition stage also provides for a phonetic segmentation of each hypothesis and transfers the segmentation result to a second recognition stage, based on a neural network. This stage performs recognition starting from the phonetic segments supplied by the first Markov step and provides in turn a list of hypotheses, each associated with a likelihood score, according to the neural recognition technique. Both scores are then linearly combined so as to form a single list, and the best hypothesis originating from such a combination is chosen as recognised utterance.

A system of this kind has some drawbacks. A first drawback is due to the second recognition step being performed starting from phonetic segments supplied by the first step: if segmentation is affected by time errors, the second step shall in turn produce recognition errors that propagate to the final list. Furthermore, such a system is inadequate for isolated word recognition within large vocabularies, since it employs as a first stage the Markov recognizer which under such particular circumstances is slightly less efficient than the neural one in terms of computational burden. Additionally, if one considers that the hypotheses provided by a Markov recognizer and a neural network recognizer show rather different score dynamics, a shear linear combination of scores may lead to results which are not significant. Finally, the known system does not supply any reliability information about the recognition effected.

Availability of said information in systems exploiting isolated word recognition is on the other hand a particularly important feature: as a matter of fact, these systems generally request the user to confirm the uttered word, thus causing a longer procedure time. If reliability information is provided, the system can request confirmation only when recognition reliability falls below a given threshold, speeding up the procedure with benefits for both the user and the system operator.

OBJECT OF THE INVENTION

The purpose of the invention is to provide a recognition method and device of the above type, which are conveniently designed to recognise isolated words within large vocabularies and which allow improving the recognition accuracy and obtaining a recognition reliability evaluation.

SUMMARY OF THE INVENTION

In particular, the method according to this invention is characterised in that the two recognition steps operate sequentially on a same utterance to be recognized, in such a way that the neural step analyses the entire active vocabulary and the Markov step analyses a partial vocabulary only, represented by the list of hypotheses provided as the neural step result, and in that additionally an evaluation of recognition reliability is made for the best hypothesis of the re-ordered list, based on the scores resulting from the combination and associated with such best hypothesis and to one or more hypotheses lying in subsequent positions in the re-ordered list, thereby producing a reliability index that may have at least two values corresponding to a recognition rated as "certain" or as "not certain", respectively.

A recognizer for carrying out the method has a neural network recognition unit is located before the recognition unit based on hidden Markov models and is capable of effecting its recognition by operating on the entire active vocabulary, and the recognition unit based on hidden Markov models is capable of effecting its recognition independently of the the neural network recognition unit, by acting on a partial vocabulary formed by the hypotheses contained in the list supplied by the neural network unit; and in that the processing unit comprises evaluation means for evaluating recognition reliability for the hypothesis that has the best likelihood score in the re-ordered list of hypotheses, by using the combined scores associated with the hypotheses contained in the re-ordered list, said evaluation means being capable of supplying a reliability index that can have at least two values corresponding to a recognition rated as "certain" or as "not certain", respectively, for such hypothesis.

BRIEF DESCRIPTION OF THE DRAWING

The above and other objects, features, and advantages will become more readily apparent from the following description, reference being made to the accompanying drawing in which.

SPECIFIC DESCRIPTION

The following description is provided purely by way of a non limiting example, assuming that the invention is used for the recognition of isolated words.

Figure 1:
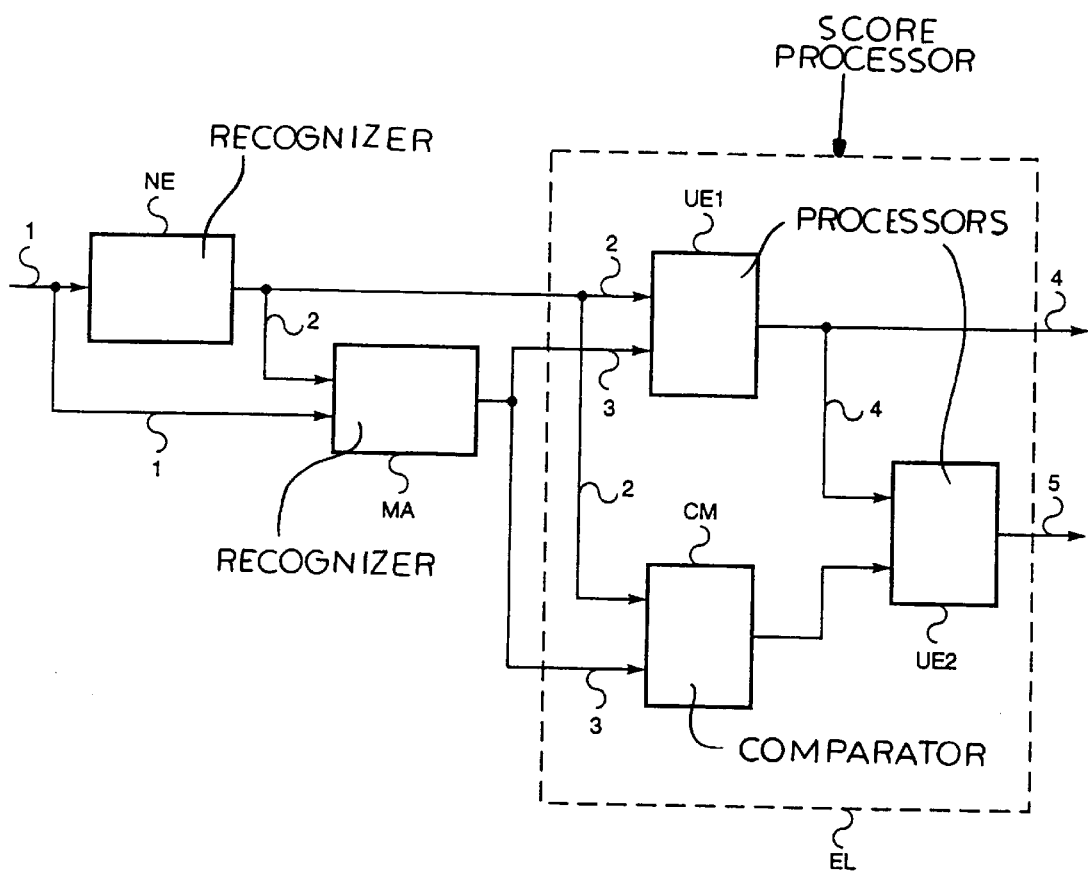
FIG. 1 is a block diagram of a recognition system according to the invention.

FIG. 1 depicts the recognition system according to the invention, formed by two recognizers NE, MA, operating in two subsequent and independent recognition steps on the speech signal arriving via line 1. As usual in the art, the signal present on line 1 will be an appropriate parametric representation (for example, a cepstral representation) of a word uttered by the speaker, obtained in processing devices (not shown) and organised in frames of a duration of for instance 10–15 ms.

Recognizer NE, which acts in the first step, is based on the neural network technique and performs recognition by using the whole active vocabulary. NE supplies on output 2 a list of the M(nn) words that form the best recognition hypotheses according to the specific type of neural network and are each associated with a respective acoustic likelihood score $nn_i$.

Output 2 of NE is also connected to the second recognizer MA, which also receives the signal present on line 1 and performs a recognition on the basis of the hidden Markov model (HiM technique, though by restricting the choice of possible recognition hypotheses to the vocabulary represented by the M(nn) words identified by recognizer NE. MA supplies in turn on an output 3 a list of M(hmm) words that represent the best recognition hypotheses according to the Markov model and are each associated with a respective acoustic likelihood score hmmj.

In a conventional way, both lists are issued as ordered lists. It must be noticed that in the most general case they may have different lengths, and, owing to the operation characteristics of MA, the M(hmm) words provided by MA will be a subset of the M(nn) words provided by NE.

Outputs 2,3 of both recognizers N, MA are connected to a score processing device EL that has to carry out two kinds of operations:

1) processing the scores relating to words present in the two lists, by normalising the scores of each word and combining the normalised scores, and, at the end of such processing, providing on a first output 4 of the system a new list re-ordered according to combined scores;
2) if both recognizers NE, MA have identified a same word as the best recognition hypothesis, computing and emitting on a second output 5 of the system a reliability index for such a word (which of course will be the best hypothesis in the combined list), by verifying that some given conditions relating to likelihood scores within such combined list are met.

Considering this twofold function, three functional blocks UE1, CM, UE2 have been depicted in the Figure within the score processing device EL. UE1 is a processing unit charged with the execution of the operations relating to the score normalization of the lists provided by NE and MA, the combination of normalized scores and the generation of the re-ordered list on the basis of the combined scores, which is issued on output 4. CM is a comparison unit that is to verify whether the best recognized word is the same in both lists and, in the affirmative, to enable unit UE2. The latter in turn is a processing unit which is to verify whether the desired conditions for combined scores are met and to issue as a consequence the reliability index on output 5. In the implementation example described herein, it will be assumed that such an index may take two values, corresponding to a recognition rated as "certain" or as "not certain", respectively.

The manner in which units UE1, UE2 perform the above operations will be described in greater detail below.

The solution adopted, with the neural recogniser NE located before the Markov recogniser MA, improves the overall efficiency. As a matter of fact, the neural network technique allows higher recognition speeds on large vocabularies, whereas the Markov model technique offers a better performance on restricted vocabularies. By using the Markov recognizer MA during the second recognition step, where only the vocabulary corresponding to the best M(nn) hypotheses obtained through the neural recognizer NE is used, it is possible to cut down the overall recognition time.

The advantages in terms of speed offered by neural networks are obtained in particular if the neural recognizer NE is of the type in which propagation of processing results is incremental (i.e. NE includes a multi-layer network where propagation from one layer to a higher one only involves significant differences among the activation values of neurons at subsequent instants), as described for instance in the European Patent Application EP-A 0 733 982 by the same Applicant. There are no special requirements for the Markov recognizer MA, which may be of any of the types known in the art.

It is worth mentioning that FIG. 1 is a functional block diagram and therefore blocks UE1, CM, UE2 will in general correspond to different parts of a program stored in processing device EL. Taking into account that also the individual recognisers NE, MA are in turn implemented by means of adequately programmed processing devices, it is obvious that a same processing device may perform the tasks of more than one of the blocks represented.

Figure 2:
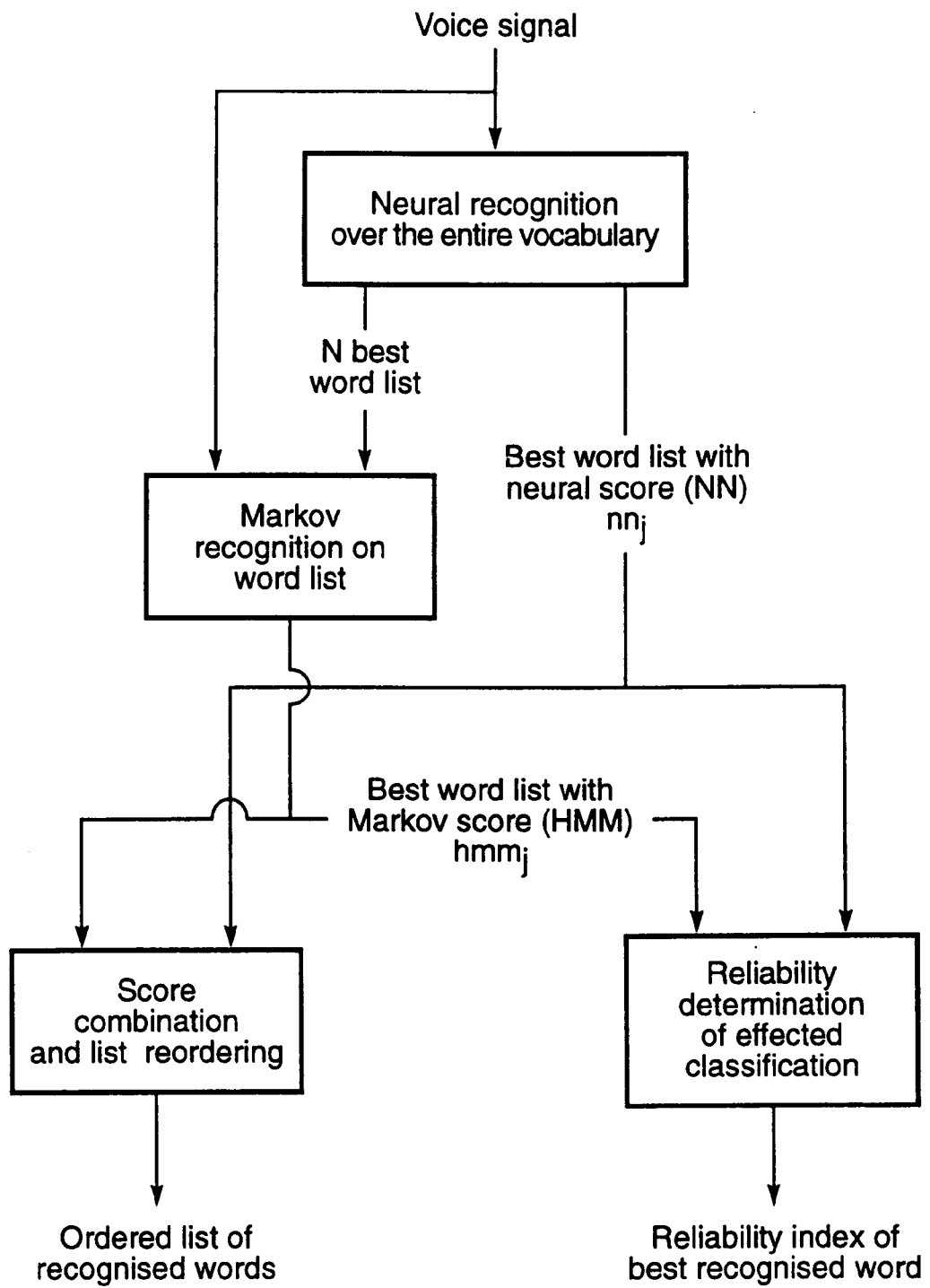
FIG. 2 is a flow chart of the recognition method according to the invention.

The entire recognition process accomplished by the device in FIG. 1 is also shown in the form of a flow chart in FIG. 2. Given the previous description, no further explanations are required.

As to the operations relating to the score processing for the hypotheses included in both lists provided by NE and MA, the first step performed by UE1 is the computation of the mean $\mu(nn)$, $\mu(hmm)$ and the variance $\sigma(nn)$, $\sigma(hmm)$ of the scores for each of the two lists, according to the known formulas:

$$\mu(nn) = \frac{1}{M(nn)} \sum_{i=1}^{M(nn)} nn_i$$

$$\mu(hmm) = \frac{1}{M(hmm)} \sum_{j=1}^{M(hmm)} hmm_j$$

$$\sigma(nn) = \sqrt{\frac{1}{M(nn)} \sum_{i=1}^{M(nn)} nn_i^2 - \mu(nn)^2}$$

$$\sigma(hmm) = \sqrt{\frac{1}{M(hmm)} \sum_{i=1}^{M(hmm)} hmm_j^2 - \mu(hmm)^2}$$

where M(hmnm), M(nn), $nn_i$, $hmm_j$ have the meaning stated above.

The subsequent step is the score normalization with respect to the mean and the variance so as to obtain two lists $NN_i$, $HMM_j$ of scores with zero mean and unitary variance. To this end UE1 carries out operations represented by the following relations:

$$NNi = \frac{nn_i - \mu(nn)}{\sigma(nn)} \quad 1 \leq i \leq M(nn)$$

$$HMMj = \frac{hmm_j - \mu(hmm)}{\sigma(hmm)} \quad 1 \leq j \leq M(hmm)$$

UE1 performs the computation of the mean and the variance of scores (and their normalization) for a list only if the number of words in that list is not lower than a given threshold M. In the preferred embodiment, it has been set M=3, i.e. the minimum value for which the mean and variance computation is possible. If the number of words in a list is lower than threshold M, instead of the score supplied by a respective recogniser, UE1 makes use of predefined score values. This in turn is a sort of normalization. In experiments conducted hitherto, a score value 3.0 has been assigned in the event of only one hypothesis, and values 2.0 and 1.0 in the event of only two hypotheses. The recognizer has moved to be little sensitive to the value of these parameters; thus any value corresponding to a good likelihood may be used.

Finally, the actual combination of the scores associated with a same word $IP_h(HMM)$, $IP_k(NN)$ within the two lists is performed, in order to generate the final list of possible words, which is then re-ordered according to the combined score. A linear combination is performed, so that any word IPx within the new list has a combined score Sx given by $$Sx = \alpha NN_h + \beta HMM_k$$

where $\alpha$ and $\beta$ are the weights assigned to each of the two recognisers.

Preferably, the two weights (stored within unit UE1) satisfy relation $\beta = 1 - \alpha$, where $\alpha = 0.5$ if both recognizers have a substantially similar performance. In case of a rather different performance, an appropriate range for values $\alpha$ and $\beta$ may be 0.4–0.6.

It is clear that the score combination is not performed in case of words present in only one list. These words (generally belonging to the list provided by the neural network, for the above described reasons) can be discarded or associated with a minimum score, so as to be inserted into the final list after the ones for which the score combination has been effected.

Figure 3:
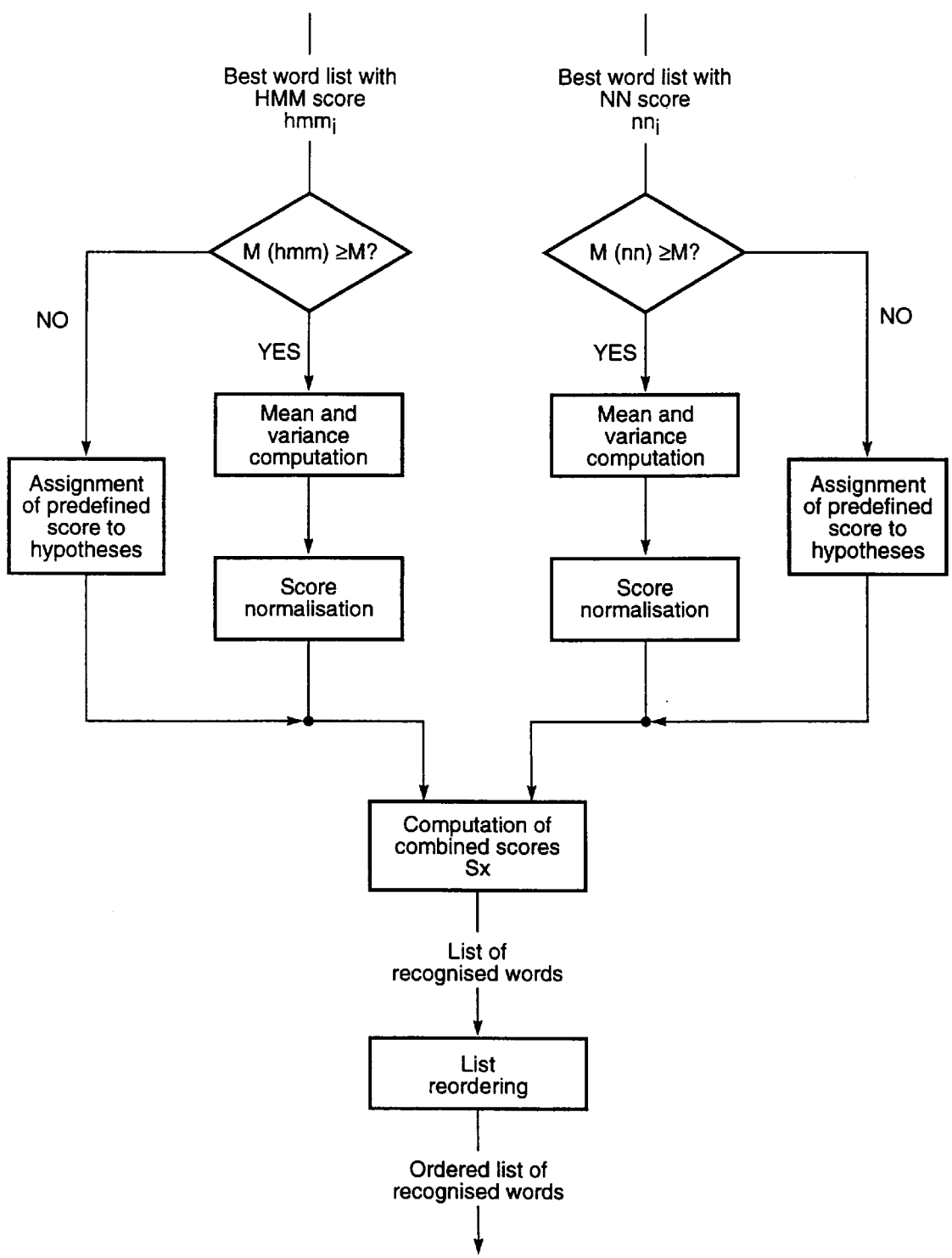
FIG. 3 is a flow chart of the operations for score combination.

By virtue of the normalization that provides lists with zero mean and unitary variance, the effects due to the different dynamics of scores supplied by both recognizers are eliminated and there is a recognition reliability improvement This method is depicted also in the flow chart FIG. 3. Given the previous description, said flow chart does not require further explanations.

Once processor UE1 has obtained the combined scores and prepared the re-ordered list, block UE2 can determine the recognition reliability of the first word in the list. As already said, operations of processor UE2 are enabled by comparator CM if it recognizes that a same word has the first position in the lists provided by NE and MA, i.e. IP1(NN)=IP1(HMM). For reliability evaluation, UE2 assesses the score associated with the best word and the score differences between that word and some of the subsequent words within the list. In particular, to consider the recognition as "certain", it is necessary to satisfy (concurrently with the condition relating to the identity of the best word within the two lists) also the following conditions:

1) the combined score S1 of the first word in the re-ordered list must be higher than a first threshold T1;
2) the differences between the combined score S1 associated with the first word in the re-ordered list and scores S2, S5 associated with the second and the fifth words are higher than a second and a third threshold T2, T3, respectively. Differences S1–S2 and S1–S5 are computed and compared with their respective threshold only if a sufficient number of hypotheses is present; in the negative, condition 2) is considered satisfied.

The threshold values are set according to the application in which the recogniser is used. For example, in experiments performed, the following values have been adopted: T1=2.0, T2=0.9; T3=2.3.

Intuitively one can see how the above mentioned conditions (which in addition to the identity of the best recognition hypothesis provided by both lists also require a sufficient score difference between the best hypothesis and the subsequent ones in the list) allow the actual evaluation of recognition reliability.

Figure 4:
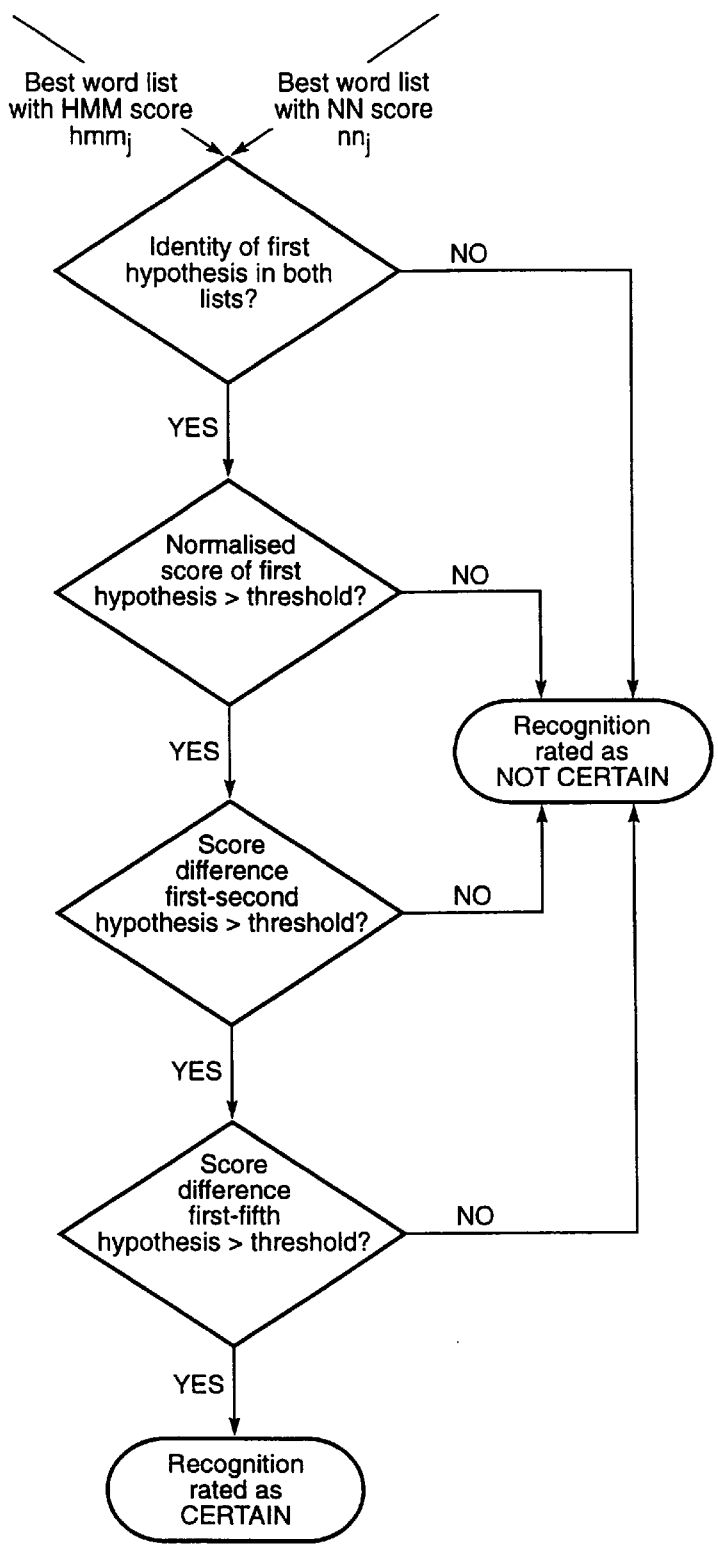
FIG. 4 is a flow chart of the operations for computation of recognition reliability.

The operations for recognition reliability evaluation are also represented in the form of a flow chart in FIG. 4. It must be observed that in this diagram the identity of the best word in both lists has been shown as a condition to be jointly verified along with other conditions, instead of being regarded as a preliminary condition to the verification of the other conditions, but it is obvious that these are only implementation details of the same principle. Also this diagram does not require further explanations.

It is evident that the description above is provided purely by way of a non limiting example and that variations and/or modifications are possible without thereby departing from the scope of the invention itself For instance, for reliability assessment, it could be possible to verify only whether the best word score is sufficiently higher than that of the second word, thus avoiding the comparison with an additional word (which might also not be the fifth, but another word sufficiently far from the second one). To verify recognition reliability one could combine in a different way the above given conditions—or add further conditions—so that an intermediate evaluation degree between "certain" and "not certain" may be introduced: as an example, an intermediate evaluation degree could be represented by meeting the conditions only for thresholds T1 and T2, but not T3. Finally, even if reference has been made in the description to isolated word recognition, the recognizer could also be used for continuous speech.

What is claimed is:

1. A method for speech recognition wherein: two recognition Steps are performed, one based on the use of neural networks, and the other on the use of hidden Markov models, each step supplying a respective list of recognition hypothesis, in which each hypothesis is associated with a respective acoustic likelihood score; the likelihood scores of each list are processed; and a single list reordered on the basis of the processed scores is provided, the two recognition steps operating sequentially on a common utterance to be recognized, in such a way that the neural network step analyses the entire active vocabulary and the Markov step analyses only a partial vocabulary represented by the list of hypotheses obtained as a result of the neural network step, and in that additionally an evaluation of recognition reliability in performed for the best hypothesis of the re-ordered list, on the basis of the scores resulting from said combination and associated with such best hypothesis and to one or more hypotheses which seize subsequent positions in the re-ordered list, thereby originating a reliability index that can take up at least two values, corresponding to the cases of recognition rated as "Certain" or "not certain", respectively.

2. A method as claimed in claim 1, characterised in that the likelihood score processing comprises the following operations:
   computing the mean and the variance of the scores associated with the hypotheses in each of the lists,
   normalizing the scores associated with the hypotheses in each of the lists with respect to the respective mean and variance, so as to transform such lists into lists where the scores have a zero mean and a unitary variance,
   linearly combining the normalised scores associated with recognition hypotheses present on both lists.

3. A method as claimed in claim 2, wherein the mean and variance computation and the score normalization for a list are only carried out if such a list includes a number of hypotheses not lower than a minimum.

4. A method as claimed in claim 3, wherein, for a list including a number of hypotheses lower than such a minimum value, the scores of the hypotheses contained in such a list are assigned predetermined values.

5. A method as claimed in claim 1, wherein for said linear combination the scores of hypotheses present on both lists are weighed according to weights having unitary sum.

6. A method as claimed in claim 1, wherein, for the creation of said single list, hypotheses present in only one list are discarded.

7. A method as claimed in claim 1, wherein, for the creation of said single list, hypotheses present in only one list are given a minimum score, lower than the minimum combined score of a hypothesis present on both lists.

8. A method as claimed in claim 1, wherein said evaluation of recognition reliability for the best recognition hypothesis in said single list is performed if said hypothesis was the best in both lists, and it includes the operations of:
   comparing the combined score associated with said best hypothesis with a first threshold,
   computing a first score difference, given by the difference between the combined score associated with said best hypothesis and that associated with the hypothesis having the next lower score, and
   comparing said first difference with a second threshold; and in that the reliability index is given a value corresponding to a recognition rated as certain, if said combined score and said first difference are both higher than their respective threshold.

9. A method as claimed in claim 8, characterised in that said recognition reliability evaluation also includes the operations of:
   computing a second score difference, given by the difference between the combined score associated with said best hypothesis and that associated with an additional hypothesis having a subsequent position which is spaced by a predefined number of positions in the re-ordered list, and
   comparing said second difference with a third threshold, and in that the reliability index is given the value corresponding to a recognition rated as certain, if also said additional difference is higher than the respective threshold.

10. A method as claimed in claim 8, wherein computation of said differences is carried out only if the lists comprise a number of hypotheses not lower than a minimum value.

11. A method as claimed in claim 10, wherein in case of lists having a number of hypotheses lower than said minimum value, the condition of exceeding the second and third threshold is regarded as satisfied.

12. A speech recognizer, including:
   a pair of cascade-connected recognition units that make use of a recognition technique based on neural networks and a recognition technique based on hidden Markov models, respectively, and provide respective lists of recognition hypotheses, in which each hypothesis is associated with a respective acoustic likelihood score, and
   a processing unit (UE1), including combination means (UE1) for combining the scores determined by both recognition units (NN, MA) and for providing a re-ordered list based on the combined scores,
characterised in that the neural network recognition unit located before the recognition unit based on hidden Markov models and is designed to perform recognition by operating on the entire active vocabulary, and the recognition unit based on hidden Markov models is designed to perform recognition independently of the neural network recognition unit by acting on a partial vocabulary formed by the hypotheses present in the list supplied by the neural network unit; and in that the processing unit includes evaluation means for evaluating recognition reliability of the hypothesis that has the best likelihood score within the re-ordered list, by using the combined scores associated with the hypotheses present in the re-ordered list, said evaluation means being capable of providing a reliability index that can take at least two values, corresponding to a recognition rated as "certain" or as "not certain", respectively, for such hypothesis.

13. The recognizer as claimed in claim 12, wherein said combination means are arranged to linearly combine likelihood scores associated with recognition hypotheses included in both lists, after performing a pre-processing thereof which includes the following operations:
   computing the mean and the variance of the scores associated with said hypotheses in each list; and normalizing the scores associated with said hypotheses with respect to the mean and the variance of their respective list, so as to transform said lists into score lists with zero mean and unitary variance.

14. The recognizer as claimed in 13, wherein such combination means are enabled to carry out the mean and the variance computation and the normalisation of the scores of the lists provided by each recognition unit (NN, MA), only if such lists include a number of hypotheses not lower than a minimum.

15. The recognizer as claimed in claim 12 wherein said evaluation means include first comparison means for comparing the best recognition hypothesis identified by the neural network recognition unit with that supplied by the recognition unit based on hidden Markov models and for emitting an enabling signal if such best hypotheses coincide, and second comparison means, enabled by said enabling signal and arranged to compare with respective thresholds the score of the best hypothesis in the re-ordered list and the difference between the score associated with the best hypothesis in the re-ordered list and the score associated with the hypothesis having an immediately lower score, and to issue said reliability index with a value corresponding to a recognition rated as certain, when such score and said difference exceed their respective threshold.

16. The recognizer as claimed in claim 15, wherein said second comparison means are designed to compare with an additional threshold the difference between the score associated with the best hypothesis of the re-ordered list and the score associated with an hypothesis that has a subsequent position and is spaced by a predefined number of positions in the re-ordered list, and to issue said reliability index with a value corresponding to recognition rated as "certain", when also such difference exceeds such additional threshold.

* * * * *